(12) United States Patent
Zachariah

(10) Patent No.: US 9,348,568 B2
(45) Date of Patent: May 24, 2016

(54) SOFTWARE APPLICATION PORTING SYSTEM

(75) Inventor: Alex George Zachariah, Kollam (IN)

(73) Assignee: Accenture Global Services Limited, Dublin (IE)

( * ) Notice: Subject to any disclaimer, the term of this patent is extended or adjusted under 35 U.S.C. 154(b) by 769 days.

(21) Appl. No.: 13/216,995

(22) Filed: Aug. 24, 2011

(65) Prior Publication Data

US 2013/0055227 A1 Feb. 28, 2013

(51) Int. Cl.
*G06F 9/45* (2006.01)

(52) U.S. Cl.
CPC ............................... *G06F 8/51* (2013.01)

(58) Field of Classification Search
None
See application file for complete search history.

(56) References Cited

U.S. PATENT DOCUMENTS

| | | | |
|---|---|---|---|
| 5,974,256 A | 10/1999 | Matthews et al. | |
| 6,356,957 B2 | 3/2002 | Sanchez, II et al. | |
| 7,065,750 B2 | 6/2006 | Babaian et al. | |
| 7,185,344 B2 | 2/2007 | Grover et al. | |
| 7,290,003 B1 * | 10/2007 | Tong | G06F 17/227 |
| 7,409,682 B2 | 8/2008 | Gazda et al. | |
| 2004/0226004 A1 * | 11/2004 | Oldman | 717/136 |
| 2006/0190501 A1 | 8/2006 | Massironi | |
| 2007/0074204 A1 | 3/2007 | Curtis et al. | |
| 2007/0192364 A1 * | 8/2007 | Zhang | 707/104.1 |
| 2009/0228527 A1 | 9/2009 | Wang | |
| 2010/0077386 A1 * | 3/2010 | Akkiraju et al. | 717/136 |

FOREIGN PATENT DOCUMENTS

EP 2131277 5/2009

OTHER PUBLICATIONS

EPO App. No. 12005990.2-211, Extended European Search Report, Dec. 19, 2012.

* cited by examiner

*Primary Examiner* — Li B Zhen
*Assistant Examiner* — Amir Soltanzadeh
(74) *Attorney, Agent, or Firm* — Brinks Gilson & Lione

(57) ABSTRACT

A software application porting system facilitates the transition of code and data compatible with an old platform version to a new platform version. The software application porting system identifies differences between the platform versions by comparing sample source code objects or sample data schemas. Then, the software application porting system utilizes the identified differences to perform an automated transformation of software application objects and schemas.

24 Claims, 9 Drawing Sheets

Version Difference Table 120

| Tag | Operation | Old Tag Value | New Tag Value | Identified Path | Enforced? |
|---|---|---|---|---|---|
| UPDATED | Modify | 06/29/2010 14:02:39 | 01/14/2011 05:11:43 | Repository | No |
| UPDATED_BY | Modify | SADMIN | AW4768 | Repository | No |
| CREATED | Modify | 06/29/2010 13:27:41 | 01/14/2011 05:11:43 | Repository | No |
| ALLOW_OBJECT_LOCKING | Insert | | Y | Repository\Project | Yes |
| UI_FREEZE | Insert | | N | Repository\Project | Yes |
| FLOW_LAYOUT | Delete | Y | | Repository\Project\Applet | Yes |
| CLASS | Modify | CSSFrameList | CSSFrame | Repository\Project\Applet | Yes |
| COMMENTS | Modify | IDC 01/26/09-R4-AZ-C | | Repository\Project\Applet | No |

Filtered Version Difference Table 235

| Tag | Operation | Old Tag Value | New Tag Value | Identified Path |
|---|---|---|---|---|
| ALLOW_OBJECT_LOCKING | Insert | | Y | Repository\Project |
| UI_FREEZE | Insert | | N | Repository\Project |
| FLOW_LAYOUT | Delete | Y | | Repository\Project\Applet |
| CLASS | Modify | CSSFrameList | CSSFrame | Repository\Project\Applet |

Figure 5

SOFTWARE APPLICATION PORTING SYSTEM

BACKGROUND OF THE INVENTION

1. Technical Field

This disclosure relates to porting software applications. In particular, this disclosure relates to modifying software applications that are compatible with a source platform version for enhanced compatibility with a destination platform version.

2. Related Art

Software applications are used across a wide variety of industries for a wide variety of purposes. Modern software applications are capable of managing complex business requirements across multiple entities while being flexible enough to allow the development of custom functionality to meet specific business needs. Many different computing platforms allow for the consistent development and execution of software applications.

Platform vendors are constantly upgrading the platforms upon which software applications run, providing support for additional functionalities and improved performance. However, vendor packages and platforms are often standardized, making customization of the platform difficult. Additional complications arise during platform version upgrades, where custom software applications and functionalities are often incompatible with the new vendor platform versions. A company risks using outdated or poorly performing technology if its computing platform is never upgraded. On the other hand, rewriting application code and altering application data to meet the compatibility requirements of an upgraded vendor platform costs the company time, effort, and money.

SUMMARY

A software application porting system facilitates the transition of code and data compatible with an old platform version to a new platform version. The software application porting system identifies differences between the platform versions by comparing sample source code objects or sample data schemas. Then, the software application porting system utilizes the identified differences to perform an automated transformation of software application objects and schemas.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. In the figures, like reference numerals designate corresponding parts throughout the different views.

FIG. 5 shows a version difference table and a filtered version difference table.

DETAILED DESCRIPTION

Figure 1:
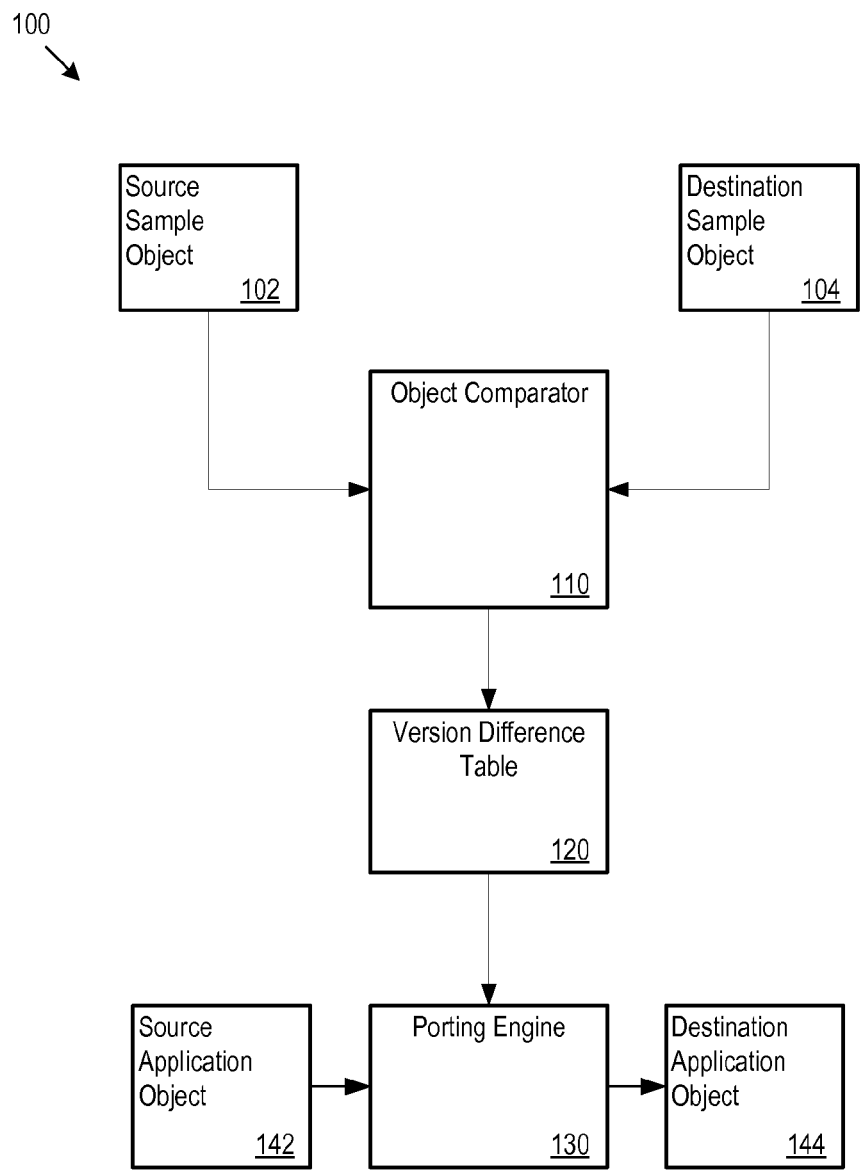
FIG. 1 shows a software application porting system.

FIG. 1 shows an example implementation of a software application porting system 100. In the example depicted in FIG. 1, the software application porting system 100 operates on a source sample object 102 and a destination sample object 104, both of which are received as inputs by an object comparator 110. The software application porting system 100 further includes a version difference table 120 and a porting engine 130. The porting engine 130 receives a source application object 142 as an input and generates a destination application object 144 as an output.

The software application porting system 100 may port any of the objects (including code) and data that implement a software application from a source platform version to a destination platform version. The platform may refer to the computing platform the software application is executed on, such as the Siebel™ platform, SAP™ platform, or Java™ platform. As one specific example used below, the software application porting system 100 may port a customer relationship management (CRM) application from one platform version to another, such as porting the CRM application from Siebel 7.5 (the source platform version) to Siebel 7.8 (the destination platform version). The software application porting system 100 may perform the porting by altering the individual objects that form the software application (e.g., a source application object 142) in the source platform version to obtain increased compatibility with the destination platform version.

To this end, the object comparator 110 may receive a source sample object 102 that provides any particular functionality and that is compatible with the source platform version. Additionally, the object comparator 110 may receive a destination sample object 104 that also provides the same particular functionality but is instead compatible with the destination platform version. Then, the object comparator 110 may compare the received source sample object 102 and destination sample object 104 to identify differences between the source platform version and the destination platform version. As described in greater detail below, the software application porting system 100 may receive and compare multiple source sample objects with corresponding (e.g., in functionality) destination sample objects to identify additional differences in the way that objects and data are implemented between the source platform version and the destination platform version. The source sample objects may include any type of object, including objects from different classes of the software application.

The object comparator 110 may store the identified differences within the version difference table 120. The software application porting system 100 may then communicate the identified differences between the source platform version and the destination platform version in the form of the version difference table 120 to the porting engine 130. Alternatively, the porting engine 130 may read the version difference table 120 from memory, or may obtain the version differences in other ways.

The porting engine 130 may also receive a source application object 142 as an input. The source application object 142 may be any object in the source platform version that the software application porting system 100 will alter for increased compatibility with the destination platform version. Next, the porting engine 130 may alter the source application object 142 based on the differences that were identified by the comparison between the sample objects. The porting engine generates a destination application object 144 as a result. The destination application object 144 may have increased compatibility with the destination platform version, as compared to the source application object. Through this software application porting process, the software application porting system 100 may port a software application from a source platform version to a destination platform version by altering each of the individual objects that form the software application with the porting engine 130, based on the version difference table 120.

Figure 2:
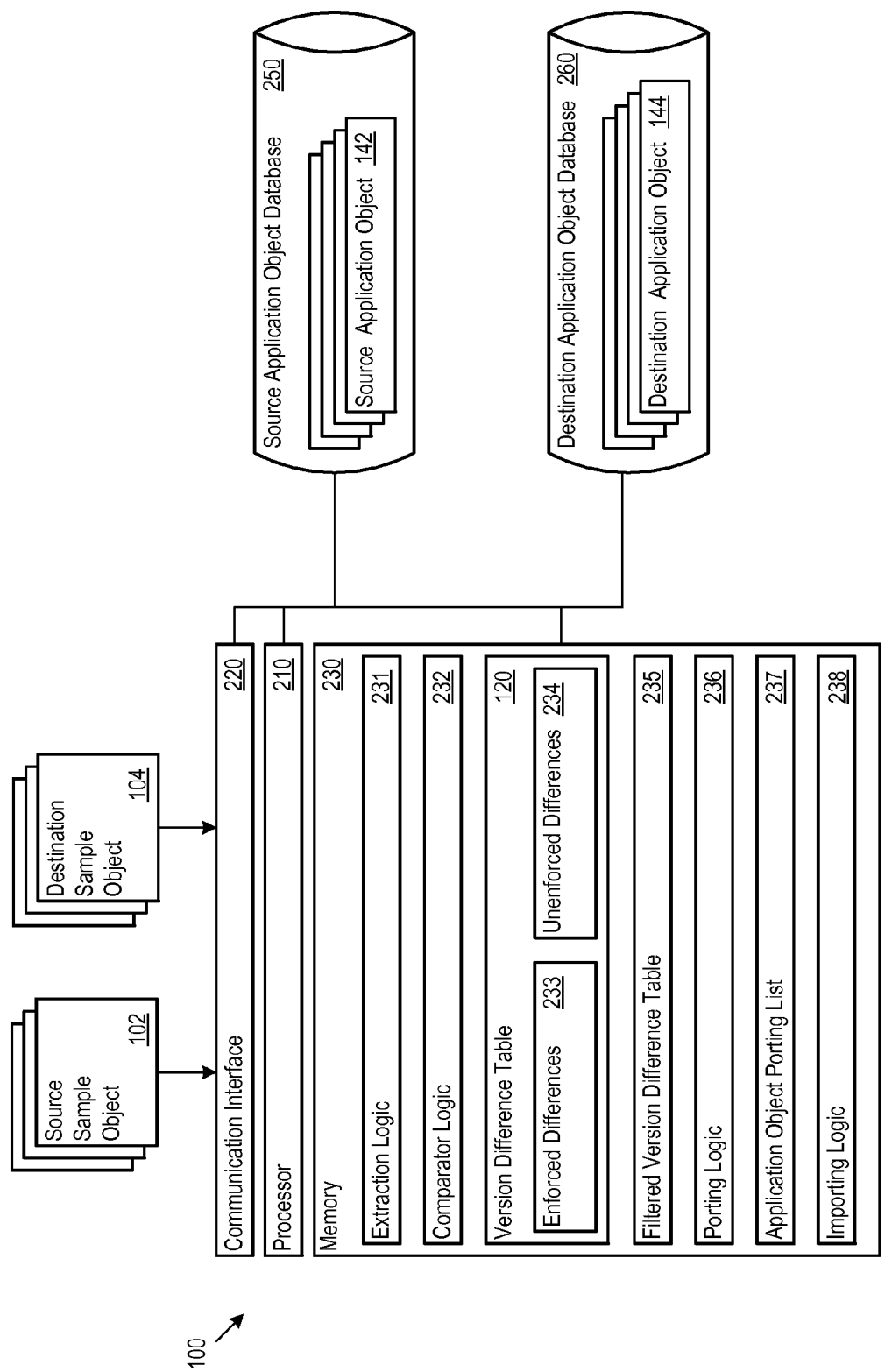
FIG. 2 shows a software application porting system.

FIG. 2 shows another example implementation of a software application porting system 100. The example software application porting system 100 depicted in FIG. 2 includes a processor 210 in communication with a communication interface 220, a memory 230, a source application object database 250, and a destination application object database 260. The memory 230 may store extraction logic 231, comparator logic 232, porting logic 236, and importing logic 238. Any of the logic 231, 232, 236, and 238 may be implemented as processor executable instructions, for example.

The memory 230 may also store a version difference table 120 and a filtered version difference table 235. In one implementation, the version table 120 distinguishes between enforced differences 233 and unenforced differences 234. As discussed in greater detail below, the system 100 may filter the version difference table 120 based on the enforced differences 233 or unenforced differences 234 to generate a filtered version difference table 235. The source application object database 250 may store multiple source application objects (e.g., the source application object 142) to port from a source platform version to a destination platform version. An application object porting list 237 may be stored within the memory 230 as well. The application object porting list 237 may include object identifiers that specify which specific source application objects to port to the destination platform version. The destination application object database 260 may store multiple destination application objects (e.g., the destination application object 144) generated from the software application porting process.

In operation, the software application porting system 100 may compare sample objects to identify differences between the source platform version and the destination platform version. The software application porting system 100 may perform the difference analysis on any number of sample objects, whether of the same or different type. In general, the difference analysis may compare any specific source sample object 102 against any specific destination sample object 104. A given source sample object 102 and a destination sample object 104 that are compared may be referred to as a comparison set of sample objects. The destination sample object 104 may be chosen based on functionality, parameters, or other features that it shares in common with the source sample object 102. For example, one particular comparison set of sample objects may include a sample applet object in Siebel 7.5 (the source sample object 102) that performs customer contact data entry, and a sample applet object in Siebel 7.8 (the destination sample object 104) that also performs customer contact data entry.

In some instances, the destination sample object 104 compared against the source sample object 102 is specifically created to capture the functionality of the source sample object 102. For example, a programmer may create the destination sample object 104 by manually converting the source sample object 102 to the destination platform version. There may be any number of such destination sample objects that match to any number of source sample objects. The matching pairs (source sample object 102 and destination sample object 104) in the comparison set provide, in effect, a training base for the software application porting system 100, from which the system 100 may determine the version differences. The extent to which all of the version differences are found depends on the sample objects that the system compares. It is not necessary to provide complete coverage that reveals every version difference. Instead, as explained below, the system 100 improves compatibility with the destination platform version even when fewer than all of the version differences are available to the system 100.

The software application porting system 100 may receive multiple comparison sets of sample objects of a particular type. For instance, the software application porting system 100 may receive multiple comparison sets of sample applet objects. Additionally, the software application porting system 100 may receive multiple comparison sets of multiple object types of sample objects as well. As an example, in porting a CRM application from Siebel 7.5 to Siebel 7.8, the software application porting system 100 may receive for comparison multiple sets of corresponding applet objects, customer objects, or other types of objects in the source platform version and the destination platform version respectively.

The degree of compatibility of a software application ported by the software application porting system 100 with the destination platform version may reflect the completeness of the version difference table 120. As the comparison sets cover increasing amounts of differences between the platform versions, the version difference table 120 becomes more complete, and the degree of compatibility increases. Thus, the selection of source sample objects and destination sample objects may determine the degree of compatibility the ported software application objects have with the destination platform version. For example, if the comparison sets received by the software application porting system 100 encompass 60% of the programmatic aspects of a particular software application overall, the source code porting process may be expected to correctly transform 60% of the programmatic aspects of the software application. Thus, the ported software application may have increased compatibility (though perhaps not complete compatibility) with the destination platform version. On the other hand, if the received sample object comparison sets encompass 100% of the programmatic aspects of the particular software application, the ported software application may be completely compatible with the destination platform version.

The source sample objects received by the software application porting system 100 may be source application objects. In other words, a subset of source application objects in the source application objects database 250 may be designated as source sample objects for comparison to identify platform version differences. As discussed above, the particular source application objects chosen as source sample objects may depend on the degree of programmatic aspects encompassed by the particular source application objects.

Alternatively or additionally, the source sample objects received by the software application porting system 102 may be manually generated, as noted above. For example, in porting a CRM application with hundreds of applet objects, a programmer may generate an applet object that includes all or part of the programmatic aspects encompassed within the hundreds of CRM application applet objects. A programmer may generate one or multiple applet objects to partially or completely encompass the applet object programmatic features. Generated applet objects may then be received by the software application porting system 100, each as a source sample object 102. A programmer may employ a similar process to manually generate source sample objects of different types or classes of objects.

For each received source sample object 102, the software application porting system 100 may also receive a destination sample object 104 in the destination platform version with matching programmatic features. A destination sample object 104 may be manually generated based on a corresponding source application object 102, that is, to match the programmatic aspects of the corresponding source application object 102. In the CRM application porting example, finding the version differences between a source sample applet object in Siebel 7.5 and a destination sample applet object with corresponding programmatic aspects in Siebel 7.8 may allow the software application porting system 100 to port any of the CRM application applet objects from Siebel 7.5 to Siebel 7.8. The ported CRM application applet objects may have varying degrees of resultant compatibility depending on the coverage provided by the selected sample applets.

In the example shown in FIG. 2, a source sample object 102 or a destination sample object 104 may be received in a tag based language format, such as Extensible Markup Language (XML). Alternatively, a source sample object 102 or a destination sample object 104 may be received in a native source platform format (i.e., the software format of the object code and software application, such as C++, Java, or other software languages). The extraction logic 231 stored in the memory 230 may convert received sample objects from the received native source platform format to a tag based language format, such as XML. Accordingly, received source sample objects 102 or destination sample objects 104 may be converted to a tag based language format for comparison. In some implementations, the source platform provides the extraction logic 231. For example, Siebel 7.5 includes a utility to export native format objects to a tag based format.

The comparator logic 232 may be implemented as processor executed instructions to identify the differences between a source sample object 102 and a destination sample object 104. In one respect, the comparator logic 232 may compare sample objects received in XML or other tag based language formats by employing an iterative comparison process. The comparator logic 232 may iteratively compare tag values, node-by-node, between the source sample object 102 and the destination sample object 104. Thus, the iterative node-by-node comparison employed by the comparator logic 232 may detect differences between the received sample objects even if the tag values are ordered differently in the source sample object 102 and the destination sample object 104.

Upon comparing the received source sample objects and destination sample objects, the comparator logic 232 may identify a path location in the source application object 102 and the destination application object 104 where a difference between platform versions occurs. The comparator logic 232 may also determine an operation to perform at the identified path location to account for the identified difference between platform versions. For example, the comparator logic 232 may identify in a source sample Applet object in Siebel 7.5 that a "FLOW_VALUE" tag and corresponding tag value are present at an identified path location of "Repository\Project\Applet." The comparator logic 232 may further identify that the "FLOW_VALUE" tag is not present in the destination sample object at the identified path location at all. Accordingly, in porting application objects from Siebel 7.5 to Siebel 7.8, the comparator logic 232 may determine that any application objects containing the "FLOW_VALUE" tag at the "Repository\Project\Applet" path location should be altered to delete the "FLOW_VALUE" tag at the identified path location.

Similarly, the comparator logic 232 may identify differing tag values between the source sample object 102 and the destination sample object 104 at an identified path location. In this situation, the comparator logic 232 may determine that any received source application object 142 should be altered at the identified path location by replacing the old tag value present in the source sample object 102 with the new tag value present in the destination sample object 104. As an example, the comparator logic 232 may identify differing "CLASS" tag values at the "Repository\Project\Applet" path location between sample applet objects received in Siebel 7.5 and Siebel 7.8. The source sample Applet object may have a "CLASS" tag value of "CSSFrameList" while the destination sample Applet object may have a "CLASS" tag value of "CSSFrame." Thus, in porting application objects from Siebel 7.5 to Siebel 7.8, the comparator logic 232 may determine that any source application objects containing a "CLASS" tag value of "CSSFrameList" at the "Repository\Project\Applet" path location should be altered to have a "CLASS" tag value of "CSSFrame" instead.

The comparator logic 232 may also identify a tag and tag value present in the destination sample object 104 that is not present in the corresponding source sample object 102. Accordingly, the comparator logic 232 may determine that an insert operation may be required to properly port objects in the source platform version to the destination platform version. For example, the comparator logic 232 may identify that a destination sample applet object contains an "ALLOW_OBJECT_LOCKING" tag with a corresponding tag value at the "Repository\Project" path location whereas the source sample applet object does not. Thus, in porting application objects from Siebel 7.5 to Siebel 7.8, the comparator logic 232 may determine that source application objects should be altered by inserting the "ALLOW_OBJECT_LOCKING" tag and a corresponding tag value at the identified "Repository\Project" path location.

The comparator logic 232 may store each of the identified differences between received sample objects in the version difference table 120, an example of which is also discussed in greater detail in FIG. 5. As mentioned above, the version difference table 120 may distinguish between enforced differences 233 and unenforced differences 234. The distinction between enforced differences 233 and unenforced differences 234 may be utilized in the process of porting source application objects 142 to the source platform version to generate destination application objects 144 in the destination process version that include the enforced differences 233 but not the unenforced differences 234.

In the example shown in FIG. 2, the code porting system 100 includes an application object porting list 237. The application object porting list 237 may include object identifiers specifying which source application objects 142 the porting logic 236 should transform from the source platform version to the destination platform version. The application object porting list 237 may be manually or automatically generated, allowing flexibility in porting a software application between platform versions. For example, in porting a CRM application from Siebel 7.5 to Siebel 7.8, a programmer may determine that a certain functionality of the CRM application is obsolete or no longer needed. The application object porting list 237 may exclude the source application objects 142 corresponding to the obsolete functionality, thereby removing the obsolete functionality when the CRM application is ported to Siebel 7.8. In one respect, the application object porting list 237 may initially contain every source application object 142 that forms the software application. Removing obsolete or undesired functionality may be accomplished manually, for example, where the programmer removes the source application objects 142 corresponding to the obsolete or undesired functionality from the application object porting list 237.

The process of porting a source application object 142 from the source platform version to the destination platform version may be directed by the porting logic 236, which may be implemented as processor executable instructions. The porting logic 236 may receive as inputs the identified differences between the source platform version and the destination platform version from the version difference table 120 and the source application objects 142 listed in the application object porting list 237 from the source application object database 250. The porting logic 236 may alter each received source application object 142 according to the identified differences to generate a destination application object 144, having increased compatibility with the destination platform version.

The porting logic 236 may alter the source application object 142 for each identified differences relevant to the source application object 142 (i.e., for each identified difference with a path location present in the source application object 142). For each relevant identified difference, the porting logic 236 may alter the source application object 142 by deleting a tag (and the corresponding tag value) no longer present in the destination platform version, modifying an old tag value to a new tag value present in the destination platform version, or inserting a new tag and corresponding tag value now present in the destination platform version.

The porting logic 236 may generate a destination application object 144 for each inputted source application object 142. Accordingly, the porting of the source application objects that implement the software application in the source platform version may result in a set of destination application objects that implement the software application in the destination platform version. The software application porting system 100 may store the generated destination application objects 144 in the destination application object database 260 after the porting process has completed.

In the example depicted in FIG. 2, the generated destination application objects may be in a tag based language format, such as XML. The software application porting system 100 may further include importing logic 238, implemented as processor executable instructions to convert the destination application objects 144 to a native destination platform format. As an example, the importing logic 238 may convert generated destination application objects 144 from XML to a format compatible with C++, Java, or other software programming languages. Thus, the source porting system 100 may extract source application objects 142 from a native source platform format to XML, transform the XML source application objects 142 to XML destination application objects 144, and import the XML destination application objects to a native destination platform format (which may be identical to the native source platform format). The importing logic 238 may be implemented in the destination platform. For example, Siebel 7.8 includes a utility to import tag based format files to create native language format objects.

Figure 3:
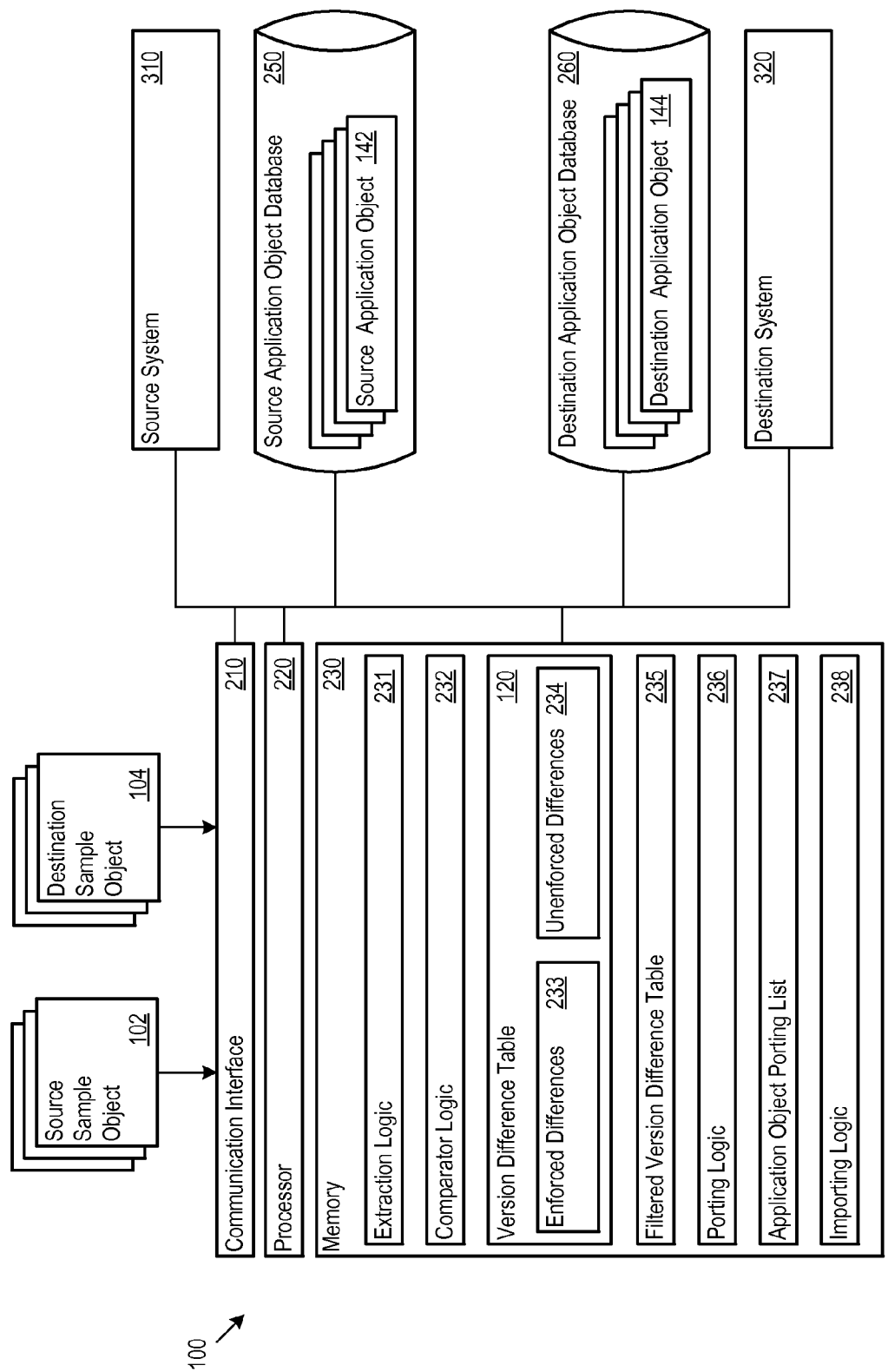
FIG. 3 shows a software application porting system.

FIG. 3 shows another example of a software application porting system 100. The software application porting system 100 includes a source system 310 and a destination system 320. The source system 310 may store the software application and may be capable of executing the software application in the source platform version. Accordingly, the software application porting system 100 may retrieve source application objects 142 from the source system 310. In the example shown in FIG. 3, the extraction logic 231 may be configured to extract the source application objects from the source system 310, convert the extracted application objects to XML (or other tag based format), and store the converted XML application objects in the source application object database 250.

The destination system 320 may be compatible with the destination platform version. Accordingly, the destination system 320 may store the ported software application and may execute the ported software application in the destination platform version. The importing logic 238 may transmit the destination application objects from the destination application object database 260 to the destination system 320. As discussed above, the importing logic 238 may convert the destination application objects from a tag based format (such as XML) to a destination platform format. Alternatively, the destination system 320 may be capable of converting destination application objects received in a tag based format to the native destination platform format.

Figure 4:
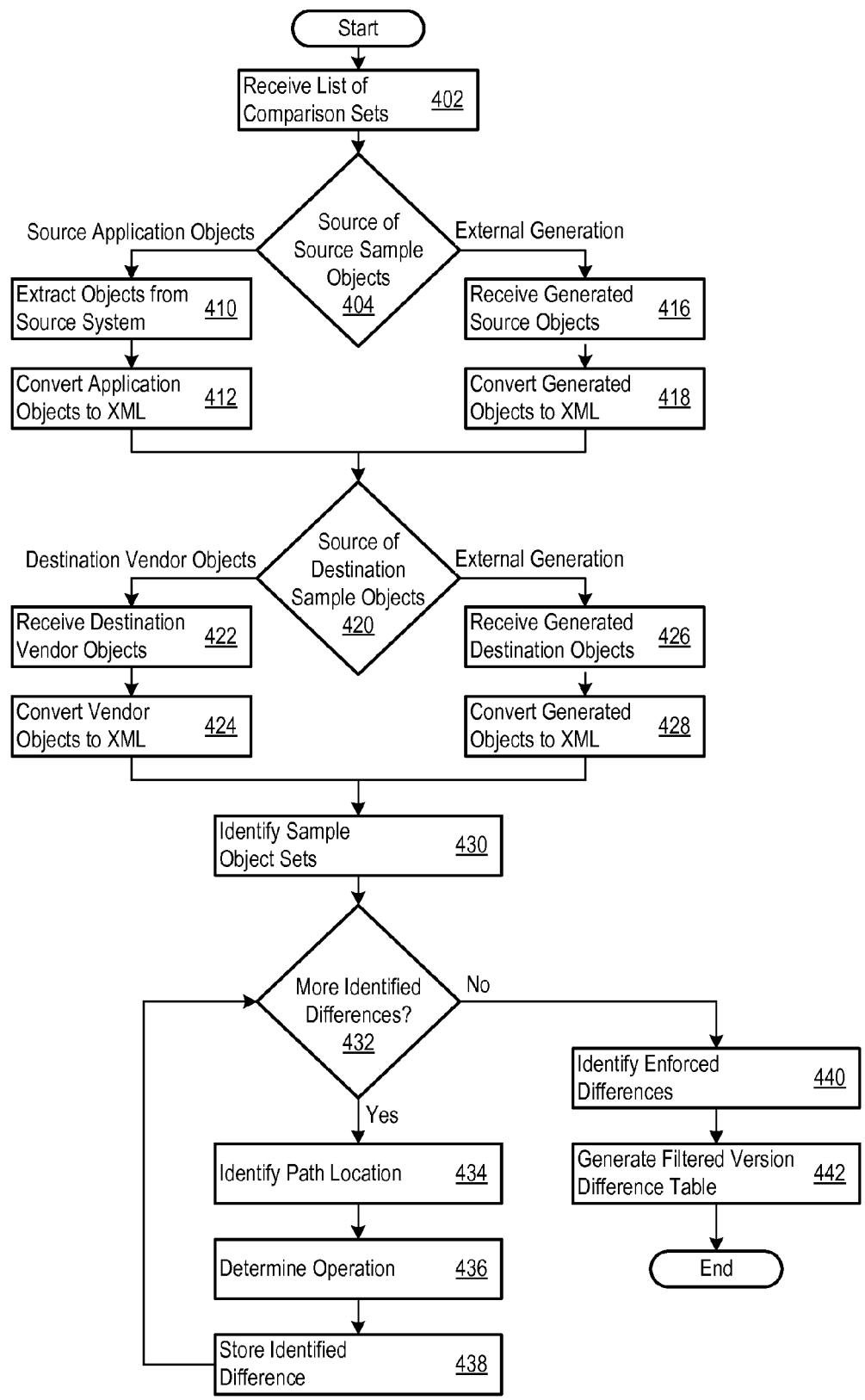
FIG. 4 shows logic that a system may implement for generating a version difference table.

FIG. 4 shows logic that the system 100 may implement as the extraction logic 231 and the comparator logic 232 to generate a filtered version difference table 235. As discussed above, the version difference table 120 may include varying types of differences identified by the comparator logic 232, i.e., either enforced differences 233 or unenforced differences 234. A filtered version difference table 235 may only include data from the version difference table 120 denoted by the enforced differences 233.

The software application porting system 100 may receive a list of comparison sets of sample objects (402). As discussed above, the comparison sets may determine the completeness of the version difference table 120, thereby affecting the ported software application's compatibility with the destination platform version. The list of comparison sets may be generated externally by a programmer. In one respect, the programmer may determine which comparison sets of sample objects to include in the application software porting process. In another respect, the list of comparison sets of sample objects may be determined by the extraction logic 231. That is, the extraction logic 231 may analyze the source application objects implementing the software application to determine the programmatic aspects of sample objects needed in order to encompass the programmatic aspects of the software application. In yet another example, the extraction logic 231 may produce a general analysis of the software application's programmatic aspects (e.g., determining the different types of objects present in the software application), allowing the programmer to select the specific sample object comparison sets to input to the software application porting system 100.

As mentioned above, each object comparison set may include a source sample object 102 and a corresponding destination sample object 104. The software application porting system 100 may receive a source sample object 102 from at least two sources (404). First, the software application porting system 100 may extract a source application object 142 from the source system 310 as a source sample object 102 (410). The extraction logic 231 may then convert the extracted source application object 142 into XML (412) or any other tag based format. Second, the software application porting system 100 may receive a manually generated source sample object 102 (416). As discussed above, source sample objects may be generated by a programmer to encompass, to a degree determined by the programmer, the programmatic aspects of the software application. In one example, the programmer may generate the source sample object 102 in XML or another tag based format. Alternatively, the programmer may generate the source sample object 102 in a non-tag based format. The extraction logic 231 may then convert the generated source sample object 102 into XML (418) or another tag based format.

Next, the software application porting system 100 may receive destination sample objects corresponding (e.g., in functionality) to the received source sample objects. The software application porting system 100 may receive corresponding destination sample objects from at least two sources (420). First, the software application porting system 100 may receive standard vendor objects in the destination platform version as a destination application object 142 (422). For example, Siebel 7.8 may include a standard customer applet object that the system 100 may receive as a destination sample object 104. The extraction logic 231 may then convert the received destination vendor object into XML (424) or any other tag based format. Second, system 100 may receive manually generated destination sample objects (426). The corresponding destination sample objects may be manually generated by a programmer to be compatible with the destination platform version. As with received vendor destination sample objects, the extraction logic 231 may likewise convert manually generated destination sample objects into XML or any other tag based format (428).

Upon receiving the source sample objects and corresponding destination sample objects, the comparator logic 232 may identify a particular sample object comparison sets (430) and begin the object comparison process. As discussed above, the comparator logic 232 may employ an iterative comparison process, traversing the compared objects node-by-node. During the comparison process, the comparator logic 232 may identify differences present within the comparison set of sample objects. The comparator logic 232 may continue the comparison process if a differences are identified (432). When a difference has been identified, the comparator logic 232 may identify the path location in the source sample object 102 where the difference occurred (434). Additionally, the comparator logic 232 may determine an operation to later perform on application objects based on the identified difference in the sample objects (436). Example operations may include an Insert operation, a Delete operation, a Modify operation, or any combination thereof. The comparator logic 232 may then store the identified difference (including the identified path and the determined operation) in the version difference table 120 (438).

The comparator logic 232 may employ the described iterative comparison process, node-by-node, for each of the received comparison sets of sample objects. Each identified difference may be stored in the version difference table 120, increasing the completeness of the version difference table 120. The comparison process may complete when the comparator logic 232 compares every received comparison set and no more differences are identified (430). The version difference table 120 may then reflect the differences between platform versions as identified from the comparison sets of sample objects.

Once the sample object comparison process has completed, the software application porting system 100 may identify the enforced differences 233 and the unenforced differences 234 stored in the version difference table 120 (440). The software application porting system 100 may then generate a filtered version difference table 235 (442). In one implementation, the system 100 may generate the filtered version difference table 235 by removing from the version difference table 120 any entry characterized as an unenforced difference 235. In an alternative implementation, the system 100 may generate a filtered version difference table 235 by keeping any entry characterized as an enforced difference 234.

FIG. 5 illustrates examples of a version difference table 120 and a filtered version difference table 235. The version difference table 120 depicted in FIG. 5 includes multiple table columns of data (e.g., 510-520) and multiple table rows storing difference data identified by the comparator logic 232 (e.g., 521-528).

Each table row in the version difference table 120 may specify one difference in an object comparison set as identified by the comparator logic 232. As discussed above, the identified difference in the object comparison set may identify a difference between platform versions. The Tag column 510 may specify the specific tag to which the comparator logic 232 identified a difference between the received sample objects. The Operation column 512 may identify the operation determined by the comparator logic 232 to later perform on application objects based on the identified difference in the sample objects (e.g., Modify, Insert, Delete, etc.). The Old Tag Value column 514 may identify the tag value of the source sample object 102 for the differing tag (i.e., the tag specified in the Tag column 510). The New Tag Value column 516 may identify the tag value of the destination sample object 104 for the differing tag. The Identified Path column 518 may identify the path location where the comparator logic 232 identified the difference in sample objects, as discussed above. The Enforced? column 520 may identify whether the identified difference is an enforced difference 233 or an unenforced difference 234.

A table row storing an identified difference may have no stored data in the Old Tag Value column 514 (e.g., 524, 525). When the determined operation is an Insert operation (i.e., a new tag and corresponding tag value are present only in the destination platform version), the differing tag may not exist in the source platform version. Thus, the different tag and tag value may not be present in the source sample object 102 at the identified path. Similarly, the version difference table 120 many include table rows where the New Tag Value column 516 has no stored data (e.g., 526, 528). When the determined operation is a Delete operation (i.e., a tag and corresponding tag value present only in the source platform version), the differing tag may not exist in the destination platform version. Accordingly, the differing tag and tag value may not be present in the destination sample object 104 at the identified path.

To elaborate on one example, the table row 526 in the version difference table 120 identifies a difference between a received source sample object 102 and a corresponding destination sample object 104. The comparator logic 232 may have identified the difference between the sample objects at a path location of "Repository\Project\Applet" as indicated by the Identified Path column value in the row 526. The difference identified by the comparator logic 232 concerned the tag "FLOW_LAYOUT." The "FLOW_LAYOUT" tag had a tag value of "Y" in the source sample object 102, and was not present in the destination sample object 104. As such, the comparator logic 232 may have determined that a Delete operation was appropriate to perform on source application objects with a "FLOW_LAYOUT" tag at the "Repository\Project\Applet" path.

The software application porting system 100 may filter the version difference table 120 based on the enforced differences 233, as indicated by the Enforced? column 520. The filtering process may result in a filtered version difference table 235. In the example shown in FIG. 5, the filtered version difference table 235 includes 4 table rows (e.g., 541-544), each of which had an Enforced? column value of "Yes" in the version difference table 120 from which the filtered version difference table 235 was generated. The filtered version difference table 235 may specify how the porting logic 236 should alter received source application objects to generate destination application objects with increased compatibility with the destination platform version. For example, according to a table row 541 of the filtered version difference table 235 depicted in FIG. 5, the porting logic 236 may insert within received source application objects an "ALLOW_OBJECT_LOCKING" tag with a corresponding "Y" tag value at the "Repository\Project" path. According to the table row 542, the porting logic 236 may also insert within received source application objects a "UI_FREEZE" tag with a corresponding "N" tag value at the "Repository\Project" path as well. In a similar way, the filtered version difference table 235 may specify Delete and Modify operations (e.g., table rows 543, 544) for the porting logic 236 to execute when altering received source application objects during the porting process.

Figure 6:
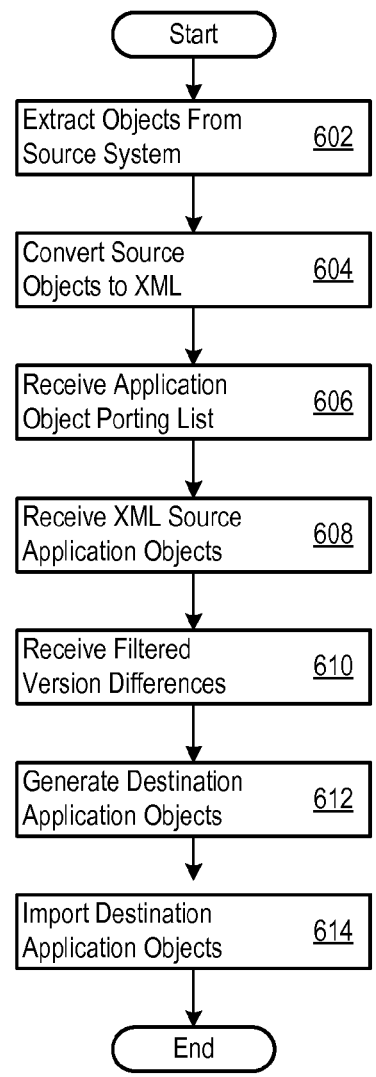
FIG. 6 shows logic that a system may implement for porting code from a source platform version to a destination platform version.

FIG. 6 shows logic that the system 100 may implement as the porting logic 236 and the importing logic 237 for porting a software application from a source platform version to a destination platform version. Once the software application porting system 100 has generated a filtered version difference table 235, the process for porting source application objects may commence. First, the extraction logic 231 may extract source application objects from the software application on the source system 310 (602), as shown in the example system 100 of FIG. 3. Alternatively, as shown in FIG. 2, the source application objects implementing the software application may have been previously received and stored in the source application object database 250. Upon receiving the source application objects, the extraction logic 231 may convert the received application objects from a native source platform format to a tag based format, such as XML (604). The system 100 may then store the converted source application objects in the source application object database 250 or transmit the converted objects to the porting logic 236.

In one implementation, the porting logic 236 may receive three inputs: the application object porting list 237 (606), the source application objects in XML format (608), and the filtered version differences from the filtered version difference table 235 (610). As discussed above, the application object porting list 237 may specify the particular received source application objects that the porting logic 236 should port from the source platform version to the destination platform version. The filtered version differences may identify the particular differences identified by the comparator logic 232 the porting logic 236 should include in porting the source application objects.

Next, the porting logic 236 may alter the specified source application objects according to the filtered differences in order to generate destination application objects (612). The porting logic 236 may alter received source application objects by performing operations specified in the filtered version difference table 235, including Insert, Modify, and Delete operations and combinations thereof. The porting logic 236 perform each determine operation relevant to the source application object (i.e., all identified differences with an identified path located in the source application object 142). The porting process results in the generation of destination application objects. In one implementation, the generated destination application objects may then be stored in the destination application object database 260.

The software application porting system 100 may import the generated destination application objects into a destination system (614). The porting process may produce destination application objects in XML format. As such, the importing logic 238 may convert the generated destination application objects to a native destination platform format compatible with the destination system 320. Alternatively, the destination system 320 may include functionality capable to import and convert objects in a tag based language format to the native destination platform format.

In addition to source code included or represented in application objects, software applications may also include data. The data schemas specifying the format of data may vary between platform versions. Even if the generated destination application objects are completely compatible with the destination platform version, the software application may not function properly because of incompatible data schemas. The software application porting system 100 may also port data schemas from a source platform version to a destination platform version as well.

Figure 7:
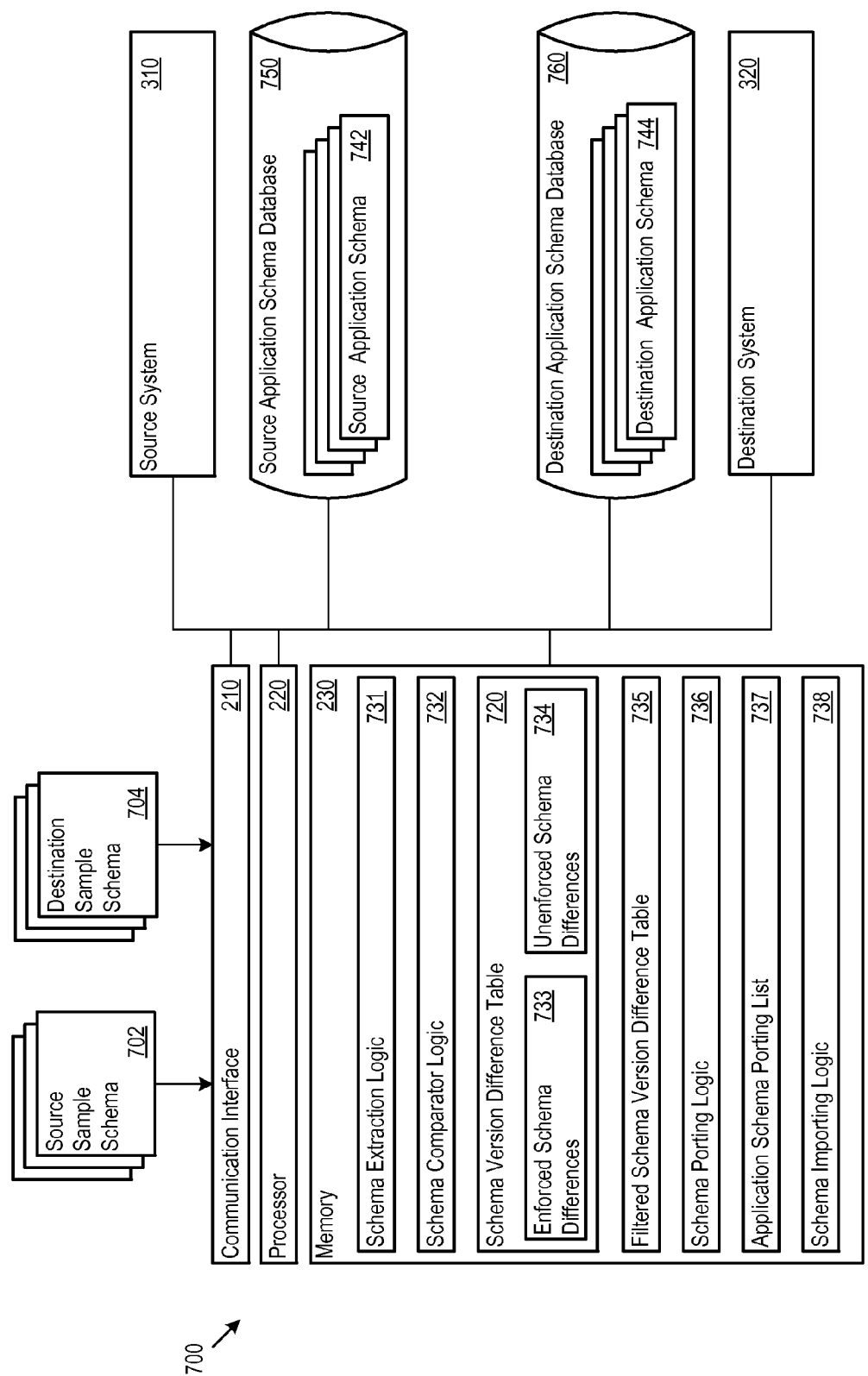
FIG. 7 shows a schema porting system.

FIG. 7 shows an example of a schema porting system 700 which may port data schemas between different platform versions. The schema porting system 700 shown in FIG. 7 includes a source application schema database 750 and a destination application schema database 760. The schema porting system 700 may receive comparison sets of data schemas. The comparison sets of data schemas may include a source sample schema 702 compatible with the source platform version, and a corresponding (e.g., in supported functionality) destination sample schema 704 compatible with the destination platform version.

In one implementation, a source application schema 742 may be input to the schema porting system 700 as a source sample schema 702. The schema porting process may be required when the destination platform version includes standard vendor schemas. The destination sample schema 704 may be a standard data schema supplied by the platform vendor. For example, Siebel may provide a standard data schema for a customer data table in Siebel 7.8, including specific fields and the length of each field.

The memory 230 may store schema extraction logic 731, schema comparator logic 732, schema porting logic 736, and schema importing logic 738. The schema extraction logic 731 may be implemented as processor executable instructions to convert received schemas (either sample or application) to XML or another tag based format. In one respect, the extraction logic 731 may also extract the source application schemas from a source system 310. The schema comparator logic 732 may be implemented as processor executable instructions to compare a source sample schema 702 in the native platform version and a destination sample schema 704 in the destination platform version. In one implementation, the schema comparator logic 732 may employ an iterative, node-by-node, comparison process to identify differences in schema comparison sets. The schema comparator logic 732 may also determine an operation to perform in order to port received source application schemas (i.e., a source application schema 742).

Schema altering operations may include a Modify operation, an Insert operation, or combinations thereof. As an example, the "NAME" field of a customer table schema in Siebel 7.5 (the source platform version) may have a field length of 30 characters. The "NAME" field for a corresponding standard vendor customer table schema in Siebel 7.8 (the destination platform version) may have a field length of 80 characters. The schema comparator logic 732 may determine that a Modify operation is appropriate to alter received source application customer table schemas with a "NAME" field. In another example, a customer table schema in Siebel 7.5 may not have a "PHONE NUMBER" field whereas a corresponding customer table schema in Siebel 7.8 does. The schema comparator logic 732 may determine that an Insert operation is appropriate (i.e., inserting a "PHONE NUMBER" field to source application customer table schemas) when porting source application schemas.

Additionally, the comparator logic 732 may instead determine that no action is needed for an identified difference between sample schemas. For example, the "NAME" field of a customer table schema in Siebel 7.5 (the source platform version) may have a field length of 80 characters. The "NAME" field for a corresponding standard vendor customer table schema in Siebel 7.8 (the destination platform version) may have a field length of 30 characters. If the "NAME" field in Siebel 7.5 application customer table schemas were reduced to 30 characters, previously stored application data may be truncated and lost. As such, the schema comparator logic 732 may determine that source application customer table schema with a "NAME" field width of 80 characters do not require any altering.

The schema porting system 700 may store schema differences identified by the schema comparator logic 732 in the schema version difference table 720. The identified schema differences between platform versions may include enforced schema differences 733 and unenforced schema differences 734. Similar to object enforced differences 233 and object unenforced differences 234, distinctions between enforced and unenforced schema differences may be manually generated by a programmer or user. The generated differences may indicate a programmer's decision to exclude schema differences that relate to obsolete or undesired functionality. Utilizing the enforced schema differences 733 and unenforced schema differences 734, the software application porting system 100 may generate a filtered schema version difference table 735 in a manner similar to generating a filtered version difference table 235.

The schema porting logic 736 may be implemented as processor executable instructions to transform received source application schemas into destination application schemas with increased compatibility with the destination platform version. Specifically, the schema porting logic 736 may receive as inputs the source application schemas (e.g., 742), an application schema porting list 737, and filtered version differences from the filtered schema version difference table 735. Like its object counterpart, the application schema porting list 737 may specify the particular source application schemas to port from the source platform version to the destination platform version. A programmer may manually generate the application schema porting list 737, eliminating schemas supporting obsolete or unwanted application functionality. The schema porting logic 736 may alter received source application schemas based on operations determined by the schema comparator logic 732. As a result, the schema porting logic 736 may generate destination application schemas (i.e., 744) with increased compatibility with the destination platform version. In one implementation, the generated destination application schemas are in a tag based format, such as XML.

The importing logic 738 may be implemented as processor executable instructions to convert generated destination application schemas from a tag based format to a data format compatible with a destination system 320. As one example, the importing logic 738 may convert generated destination application schemas from XML to a relational database format compatible with a destination system 320. The importing logic 738 may also import the converted destination application schemas into the destination system 320 as well.

Figure 8:
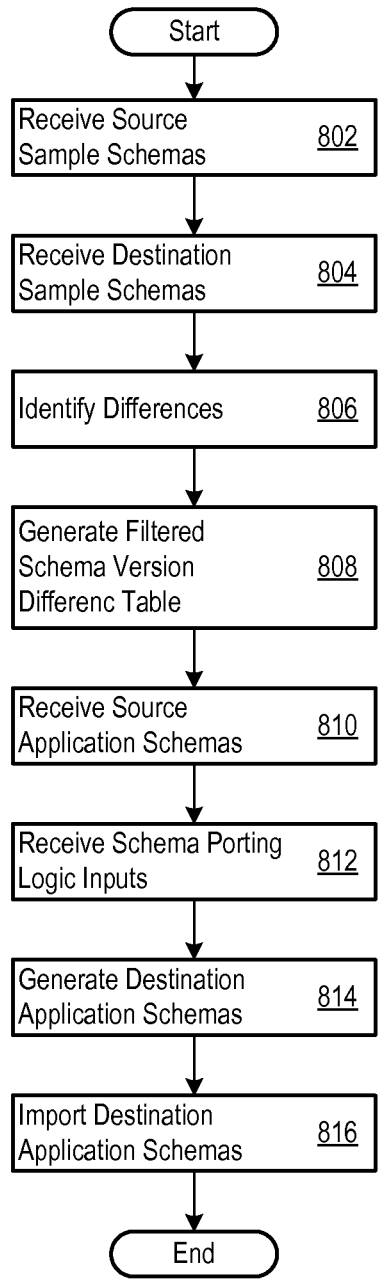
FIG. 8 shows logic that a system may implement for porting a database schema from a source platform version to a destination platform version.

The schema porting system 700 may port a data schema in a way similar to the way that the software application porting system 100 ports an application object. FIG. 8 shows logic that the schema porting system 700 may implement as the schema extraction logic 731, the schema comparator logic 732, the schema porting logic 736, and the schema importing logic 738 for porting a database schema from a source platform version to a destination platform version. As discussed above, the software application porting system 100 may receive source sample schemas (802) and corresponding destination sample schemas (804). A source sample schema 702 and a corresponding destination sample schema 704 may form a schema comparison set. By comparing each received comparison set of sample schemas, the schema comparator logic 732 may identify the differences between platform versions (806). The comparator logic 732 may identify where in the schema a difference is identified (e.g., a field location) and the difference (e.g., varying field widths). The comparator logic 732 may further determine an operation to perform based on the identified difference (e.g., Insert, Modify, or no action).

Next, the schema porting system 700 may generate a filtered schema version difference table 735 (808), as described in greater detail above. Upon identifying schema differences between platform versions (i.e., data in the filtered schema version difference table 735), the software application porting system 100 may receive source application schemas (810). As an example, the software application porting system 100 may extract the source application schemas from the source system 310.

The schema porting logic 736 may then receive three inputs (810). First, the schema porting logic 736 may receive the source application schemas (e.g., 742) to port to the destination platform version. Second, the schema porting logic 736 may receive the application schema porting list 737 indicating which specific source application schemas the schema porting logic 736 should alter. Third, the schema porting logic 736 may receive the identified schema differences via the filtered schema version difference table 735. Upon receiving the three inputs, the schema porting logic 736 may alter source application schemas according to the identified schema differences in order to generate destination application schemas (e.g., 744) (814). Lastly in FIG. 8, the software application porting system 100 may import the generated application schemas into a destination system 320 (816).

Figure 9:
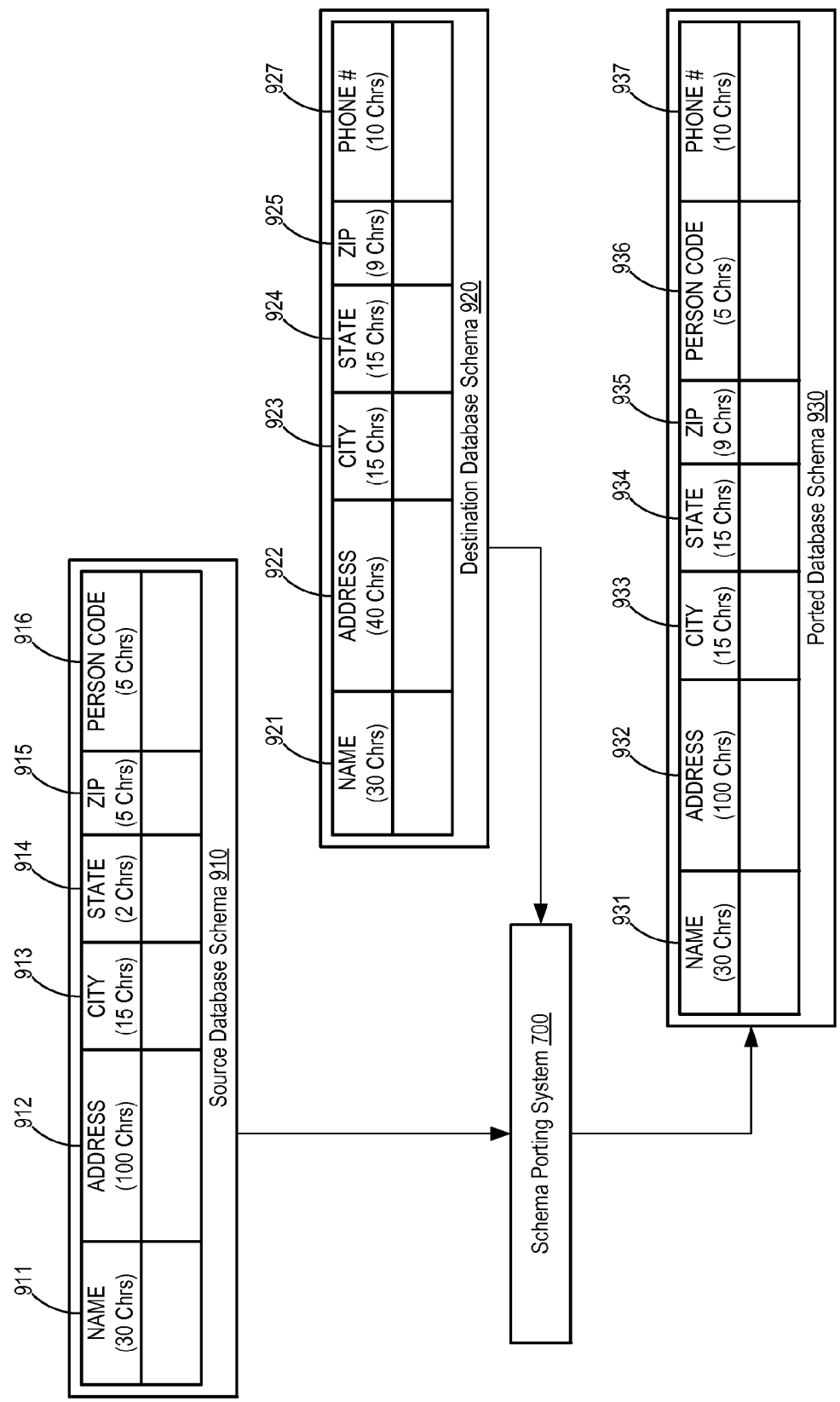
FIG. 9 shows an example of a ported database schema.

FIG. 9 shows an example of a source database schema 910, a destination database schema 920, and a ported database schema 930. The source database schema 910 may be a source sample schema 702, and the destination database schema 920 may be a destination application schema 704, such as a standard vendor schema. Both the source database schema 910 and the destination database schema 920 may be received by the software application porting system 100 as inputs in the application porting process.

The source database schema 910 may be compatible with a source platform version, such as Siebel 7.5. The source database schema 910 may include a "NAME" field 911 with a field width of 30 characters, an "ADDRESS" field 912 with a field width of 100 characters, a "CITY" field 913 with a field width of 15 characters, a "STATE" field 914 with a field width of 2 characters, a "ZIP" 915 field with a field width of 5 characters, and a "PERSON CODE" field 916 with a field width of 5 characters.

The destination database schema 920 may be compatible with a destination platform version, such as Siebel 7.8. The destination database schema 920 may include a corresponding "NAME" field 921 with a field width of 30 characters, a corresponding "ADDRESS" field 922 with a field width of 40 characters, a corresponding "CITY" field 923 with a field width of 15 characters, a corresponding "STATE" field 924 with a field width of 15 characters, a corresponding "ZIP" field 925 with a field width of 9 characters, and a "PHONE #" field 927 with a field width of 10 characters.

Upon receiving the source database schema 910 and the destination database schema 920 as inputs, a software application porting system 100 may generate the ported database schema 930. The ported database schema 930 may have increased compatibility with the destination platform version. In FIG. 9, the field width is consistent between the "NAME" fields of each platform version (i.e., 911 and 921) and the "CITY" fields of each platform version (i.e., 913 and 923). Accordingly, the ported database schema 930 includes a "NAME" field 931 with a matching field width of 30 characters and a "CITY" field 933 with a matching field width of 15 characters. The "ADDRESS" field 912 of the source database schema 910 is greater in length than the "ADDRESS" field 922 of the destination database schema 920. As such, the ported database schema 930 may receive the field width of the 100 character "ADDRESS" field 912 field width from the source database schema 910. Similarly, the destination database schema 920 has longer field widths that the source database schema 910 for both the "STATE" field (e.g., 914 and 924) and the "ZIP" field (e.g., 915 and 925). Thus, the ported database schema 930 may receive the field widths for the "STATE" field 934 and the "ZIP" field 935 from the destination database schema fields. In FIG. 9, the respective field widths of the ported database schema 930 are 15 characters for the "STATE" field 934 and 9 characters for the "ZIP" field 935.

As discussed above, the schema porting system 700 may alter a source application schema 742 to receive the longer of differing field widths between platform versions. By having ported schemas receive the longer field width of compared platform versions field widths, the schema porting system 700 may prevent truncation (i.e., loss) of data previously generated by the software application in the source platform version. Having ported schemas receive the longer field width between platform versions may also support application functionality present in the destination platform version that requires additional characters of data.

Similarly, the ported database schema 930 may include table fields present only in the source platform version or the destination platform version. In the example shown in FIG. 9, the ported database schema 930 includes both a "PERSON CODE" field 936 and a "PHONE #" field 937. The source database schema 910 includes a corresponding "PERSON CODE" field 916, but not a "PHONE #" field. The destination database schema 920 includes a corresponding "PHONE #" field 927, but not a "PERSON CODE" field. The software application porting system 100 may determine that both fields should be present in the ported database schema 930. Doing so may prevent truncation of data previously generated by the software application (e.g., keeping the "PERSON CODE" field) and support functionality present in the destination platform version requiring additional fields (e.g., the "PHONE #" field 937).

In general, the logic and processing described above may be encoded or stored in a machine-readable or computer-readable medium such as a compact disc read only memory (CDROM), magnetic or optical disk, flash memory, random access memory (RAM) or read only memory (ROM), erasable programmable read only memory (EPROM) or other machine-readable medium as, for examples, instructions for execution by a processor, controller, or other processing device. The medium may be implemented as any device or tangible component that contains, stores, communicates, propagates, or transports executable instructions for use by or in connection with an instruction executable system, apparatus, or device. Alternatively or additionally, the logic may be implemented as analog or digital logic using hardware, such as one or more integrated circuits, or one or more processors executing instructions that perform the processing described above, or in software in an application programming interface (API) or in a Dynamic Link Library (DLL), functions available in a shared memory or defined as local or remote procedure calls, or as a combination of hardware and software. As examples, the extraction logic 231, the comparator logic 232, and the porting logic 236 may be implemented in software, hardware, or both. The logic may be functionally partitioned to meet to goals of any specific implementation. For example, the extraction logic 231, the comparator logic 232, and the porting logic 236 may be separate processing systems or individual programs, or may be integrated into a single processing system or program.

The systems may include additional or different logic and may be implemented in many different ways. A processor may be implemented as a controller, microprocessor, digital signal processor, microcontroller, application specific integrated circuit (ASIC), discrete logic, or a combination of other types of circuits or logic. Similarly, memories may be Dynamic Random Access Memory (DRAM), Static Random Access Memory (SRAM), Flash, or other types of memory. Parameters (e.g., conditions and thresholds) and other data structures may be separately stored and managed, may be incorporated into a single memory or database, or may be logically and physically organized in many different ways. Programs and instructions may be parts of a single program, separate programs, implemented in libraries such as Dynamic Link Libraries (DLLs), or distributed across several memories, processors, cards, and systems.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for porting a software application in a source platform version to a destination platform version, the method comprising:
   identifying a source sample object in the source platform version that provides selected functionality;
   identifying a destination sample object in the destination platform version that also provides the selected functionality;
   identifying specific object differences between the source sample object itself and the destination sample object itself, where the specific object differences identify programmatic differences between the source sample object and the destination sample object;
   categorizing the specific object differences into enforced object differences and unenforced object differences in a version difference table, where the enforced object differences represent differences required to be accounted for when porting to the destination platform, and the unenforced object differences represent differences not required to be accounted for when porting to the destination platform;
   selecting a source application object in the source platform version to convert to the destination platform version; and transforming the source application object into a destination application object for use with the destination platform version by altering the source application object by:
   determining a tag specifier of an object tag;
   inserting the tag specifier into an entry for the object tag in the version difference table;
   marking the entry in the version difference table as an 'Insert' enforced object difference with respect to the object tag;
   identifying a path location for the object tag for the destination platform version;
   obtaining a tag value for the object tag in the destination platform version from the path location;
   inserting the object tag specified by the tag specifier into the source application object; and
   inserting the tag value for the object tag into the source application object.

2. The method of claim 1, further comprising, in preparation for identifying the specific object differences:
   exporting the source sample object from a native source platform format to a tag based language format; and
   exporting the destination sample object from a native destination platform format to the tag based language format.

3. The method of claim 1, further comprising, in preparation for altering the source application object:
   exporting the source application object from a native source platform format to a tag based language format.

4. The method of claim 3, where altering comprises:
   altering the source application object in its tag based language format to account for the specific object differences to obtain the destination application object; and
   importing the destination application object into a destination system that is compatible with the destination platform version.

5. The method of claim 3 further comprising:
   determining that the object tag is not present in the source application object.

6. The method of claim 1, further comprising:
   inserting the path location in the version difference table.

7. The method of claim 6, further comprising:
   determining how to account for the specific object differences.

8. The method of claim 7, where
   determining how to account for the specific object differences comprises determining whether to perform an insertion, a deletion, or a modification.

9. A software application porting system comprising:
   a processor;
   a memory in communication with the processor; and
   logic stored in the memory, that, when executed by the processor, is operable to:
      identify a source sample object in a source platform version that provides selected functionality;
      identify a destination sample object in a destination platform version that also provides the selected functionality;
      identify specific object differences between the source sample object and destination sample object in a version different table, where the specific object differences identify programmatic differences between the source sample object and the destination sample object;
      select a source application object in the source platform version to convert to the destination platform version; and
      alter the source application object by:
         determining a tag specifier of an object tag, inserting the tag specifier into an entry for the object tag in the version difference table, marking the entry in the version difference table as an 'Insert' enforced object difference with respect to the object tag, identifying a path location for the object tag for the destination platform version, obtaining a tag value for the object tag in the destination platform version from the path location, inserting the object tag specified by the tag specifier into the source application object, and inserting the tag value for the object tag into the source application object to transform the source application object into a destination application object for use with the destination platform version by:
            exporting the source application object from a native source platform format to a tag based language format; and
            altering the source application object in its tag based language format to account for the specific object differences.

10. The software application porting system of claim 9, where the logic, when executed, is further operable to:
    categorize the specific object differences into enforced object differences and unenforced object differences, where the enforced object differences represent differences required to be accounted for when porting to the destination platform, and the unenforced object differences represent differences not required to be accounted for when porting to the destination platform; and
    where the logic, when executed:
    alters the source application object to account for the enforced object differences, but not for the unenforced object differences.

11. The software application porting system of claim 9, where the logic, when executed, is further operable to:
    export the source sample object from a native source platform format to a tag based language format; and
    export the destination sample object from a native destination platform format to the tag based language format.

12. The software application porting system of claim 9, where the logic, when executed, is further operable to:
    import the destination application object from a tag based language format into a destination system that is compatible with the destination platform version.

13. The software application porting system of claim 9, where the logic, when executed by the processor, is operable to
    determine that the object tag is not present in the source application object.

14. The software application porting system of claim 9, where the logic, when executed by the processor, is further operable to:
    insert the path location in the version difference table.

15. The software application porting system of claim 14, where the logic, when executed by the processor, is further operable to:
    determine how to account for the specific object differences.

16. The software application porting system of claim 15, where the logic, when executed by the processor, is operable to determine how to account for the specific object difference by determining whether to perform an insertion, a deletion, or a modification.

17. The software application porting system of claim 9, where the logic, when executed by the processor, is further operable to:
  mark the entry as an 'Insert' enforced object difference responsive to determining that the object tag is absent from the source application object but required by the destination platform version.

18. A software application porting system comprising:
  a processor;
  a memory in communication with the processor; and
  logic stored in the memory, that, when executed by the processor, is operable to:
    identify a source sample object in a source platform version that provides selected functionality;
    identify a destination sample object in a destination platform version that also provides the selected functionality;
    identify a specific object difference between the source sample object and destination sample object in a version difference table, where the specific object difference identifies a programmatic difference between the source sample object and the destination sample object by:
      exporting the source sample object from a native source platform format to a tag based language format; and
      exporting the destination sample object from a native destination platform format to the tag based language format; and
      comparing the source sample object in the tag based language format with the destination sample object in the tag based language format to determine the specific object difference;
    select a source application object in the source platform version to convert to the destination platform version; and
    alter the source application object by:
      determining a tag specifier of an object tag, inserting the tag specifier into an entry for the object tag in the version difference table, marking the entry in the version difference table as an 'Insert' enforced object difference with respect to the object tag, identifying a path location for the object tag for the destination platform version, obtaining a tag value for the object tag in the destination platform version from the path location, inserting the object tag specified by the tag specifier into the source application object, and inserting the tag value for the object tag into the source application object to transform the source application object into a destination application object for use with the destination platform version.

19. The system of claim 18, where the logic is further operable to:
  categorize the specific object difference as an enforced object difference instead of an unenforced object difference, where the enforced object difference represents a difference required to be accounted for when porting to the destination platform, and the unenforced object difference represents a difference not required to be accounted for when porting to the destination platform.

20. The method of claim 1, further comprising inserting the tag value for the object tag at the path location for the destination platform version.

21. The system of claim 9, where the logic is further operable to insert the tag value for the object tag at the path location for the destination platform version.

22. The system of claim 9, where logic is operable to alter the source application object responsive to presence of the object tag in the destination sample object and absence of the object tag in the source destination object.

23. The system of claim 18, where the logic is further operable to insert the tag value for the object tag at the path location for the destination platform version.

24. The system of claim 18, where the specific object difference comprises:
  presence of the object tag in the destination sample object and absence of the object tag in the source destination object.

* * * * *